United States Patent
Romero (10) Patent No.: US 9,140,295 B2
(45) Date of Patent: Sep. 22, 2015

(54) HYDRODYNAMIC BEARING INTENDED TO SUPPORT A CYLINDER DRIVEN IN ROTATION ABOUT ITS AXIS

(75) Inventor: Eric Romero, Herin (FR)

(73) Assignee: FIVES FCB, Villeneuve d'Ascq (FR)

( * ) Notice: Subject to any disclaimer, the term of this patent is extended or adjusted under 35 U.S.C. 154(b) by 392 days.

(21) Appl. No.: 13/579,125

(22) PCT Filed: Mar. 24, 2011

(86) PCT No.: PCT/FR2011/000169
§ 371 (c)(1),
(2), (4) Date: Sep. 27, 2012

(87) PCT Pub. No.: WO2011/117482
PCT Pub. Date: Sep. 29, 2011

(65) Prior Publication Data
US 2013/0012111 A1 Jan. 10, 2013

(30) Foreign Application Priority Data
Mar. 25, 2010 (FR) ...................................... 10 01194

(51) Int. Cl.
*F16C 13/04* (2006.01)
*F16C 27/00* (2006.01)
(Continued)

(52) U.S. Cl.
CPC .................. *F16C 13/04* (2013.01); *F16C 17/02* (2013.01); *F16C 27/02* (2013.01)

(58) Field of Classification Search
CPC ........... F16C 13/04; F16C 27/00; F16C 32/06
USPC ............ 451/278, 328; 241/176; 384/278, 125
See application file for complete search history.

(56) References Cited

U.S. PATENT DOCUMENTS 1,919,489 A * 7/1933 Treschow ...................... 384/310
3,720,288 A * 3/1973 Tschabold ...................... 184/6.4
(Continued)

FOREIGN PATENT DOCUMENTS

EP 0 486 371 A2 5/1992
EP 1 430 951 A1 6/2004
(Continued)

OTHER PUBLICATIONS

International Search Report, dated Jun. 20, 2011, from corresponding PCT application.
(Continued)

*Primary Examiner* — Robert Rose
(74) *Attorney, Agent, or Firm* — Young & Thompson (57) ABSTRACT

A hydrodynamic bearing for supporting a hollow cylinder that may be deformable in the radial direction, driven in a rotational movement about its axis, the diameter being greater than or equal to one meter, the bearing essentially consisting of a bushing and a bushing support, and in which the bushing, notably of constant thickness, extends over a portion of cylinder of axis δ, having a guide surface, intended to follow the exterior surface of the cylinder via a film of lubricant, and a surface secured to the bushing support. The bushing support has, if appropriate locally, at least in the region of an intermediate zone of the bearing, cross-section-reducing elements allowing elastic deformation of the bearing so as to limit the maximum value of the guide forces over the bushing. The bearing is useful in supporting and guiding a rotating hollow grinder subjected to unevenly distributed forces during rotation.

19 Claims, 5 Drawing Sheets

(51) Int. Cl.
*F16C 32/06* (2006.01)
*F16C 17/02* (2006.01)
*F16C 27/02* (2006.01)

(56) References Cited

U.S. PATENT DOCUMENTS

| | | | |
|---|---|---|---|
| 4,188,077 A | 2/1980 | Chielens et al. | |
| 4,209,079 A * | 6/1980 | Marchal et al. | 184/6.1 |
| 5,114,244 A * | 5/1992 | Dunham et al. | 384/103 |
| 5,205,494 A * | 4/1993 | Durinck et al. | 241/30 |
| 5,743,475 A | 4/1998 | Catani | |
| 5,938,344 A * | 8/1999 | Sabin | 384/278 |
| 2014/0203128 A1* | 7/2014 | Enders et al. | 241/176 |

FOREIGN PATENT DOCUMENTS

| | | |
|---|---|---|
| GB | 1174429 A | 12/1969 |
| JP | 32007665 | 9/1957 |
| JP | 53122977 A | 10/1978 |
| JP | 5502288 A | 4/1993 |
| JP | 0691188 A | 4/1994 |
| JP | 09133127 A | 5/1997 |
| JP | 10288220 A | 10/1998 |
| WO | 9203667 A1 | 3/1992 |

OTHER PUBLICATIONS

Translation of Japanese Office Action, dated Nov. 11, 2014, from corresponding JP application.

* cited by examiner

HYDRODYNAMIC BEARING INTENDED TO SUPPORT A CYLINDER DRIVEN IN ROTATION ABOUT ITS AXIS

The invention concerns a hydrodynamic bearing intended to support a cylinder driven in a rotation movement about its axis.

The invention will find a particular application for the support and guidance of a rotating hollow cylinder subjected to unequally distributed forces, such as in particular that of a grinder.

The invention will also concern a grinder equipped with a hydrodynamic bearing according to the invention.

In order to finely grind materials such as raw materials for manufacturing cement, clinker or certain ores, a grinder is known consisting of a hollow cylinder driven in a rotation movement on its axis and the internal wall of which constitutes a circular track. The material is applied in a layer on the circular track, and the grinding is obtained by means of one or more rollers, internal to the hollow cylinder, with axes parallel to said hollow cylinder, and applied under pressure, by means of rams, on the circular track when the cylinder rotates. Such a grinder is in particular taught in the document EP 0 486 371. The forces exerted by the roller or rollers cause a deformation in the radial direction.

The hollow cylinder of the grinder is supported by means of one or more bearings, the guide surface of which matches the external surface of the hollow cylinder.

It is possible to use a single bearing or two groups of bearings spaced apart, provided that the radial direction of the force resulting from the loads is situated in the angle at the center defined by the outermost ends of the bearings. When the bearings are distributed in two groups situated on either side of the radial direction in which the maximum force is exerted, the deformation of the cylinder takes place in the free space lying between the bearings.

When the cylinder is supported by a single bearing, the elastic deformation of the cylinder takes place above said bearing and causes a local reduction in the thickness of the liquid film, which results in the exerting at the same point of an excess pressure, at the risk of damaging the bearing shell. The reduction in thickness is particularly significant in the case of a large cylinder, having in particular a diameter greater than one meter.

The aim of the present invention is therefore to overcome the aforementioned drawbacks by proposing a hydrodynamic bearing for supporting and guiding a cylinder subjected to unequally distributed forces.

The invention will also concern a grinder equipped with a hydrodynamic bearing according to the invention, more particularly but not exclusively in the case of a grinder with a single roller.

Other aims and advantages of the present invention will emerge during the following description, which is given merely indicatively and has no limitative purpose.

The invention concerns first of all a hydrodynamic bearing intended to support a cylinder, hollow, possibly deformable in the radial direction, driven in a rotation movement about its axis, said bearing consisting essentially of a shell and a shell support, and in which said shell extends in a portion of a cylinder of axis $\delta$, having a guide surface, of a radius of curvature corresponding to the radius of curvature of said cylinder, intended to match the external surface of said cylinder through the intermediary of a film of lubricant, and a surface secured to said shell support, opposite said guide surface.

According to the invention, the diameter of said cylinder is greater than or equal to 1 meter and the shell is made from a soft metal, said shell support being made from metal with a hardness greater than the metal of said shell, said shell support absorbing the forces over the entire surface of said shell opposite to the guide surface, without any discontinuity of contact in order to control the deformation of said shell, the shell support having, at least at an intermediate area of said bearing, means of weakening the cross section conferring on said shell support an elasticity, allowing an elastic deformation of said bearing so as to limit the maximum value of the guide forces on said shell.

The bearing according to the invention thus reduces the excess localized pressure and thus the risk of damaging the shell and the bearing, giving a flexibility so that the bearing slightly deforms by itself elastically at the point where the maximum force is exerted, thus posing the reduction in thickness of the film of lubricant.

In a system where the forces vary over time, the invention enables the bearing to adapt permanently, the compensation afforded by the elasticity of the support being all the greater, the higher the level of forces exerted.

According to optional features:
- the means of weakening the cross section extend, in a direction parallel to the axis $\delta$, over the entire length of said bearing,
- said means of weakening the cross section consist of one or more recesses,
- the shell support is in a single piece, the means of weakening the cross section consisting of an oblong recess extending parallel to the curvature of the shell, said oblong recess passing through in a direction parallel to said axis $\delta$,
- the shell support is in a single piece, said means of weakening the cross section consisting of an oblong recess extending parallel to a tangent to said cylinder $\delta$, said oblong recess passing through in a direction parallel to said axis $\delta$,
- the shell support is in a single piece, the means of weakening the cross section consisting of a set of recesses, parallel to each other and passing through in a direction parallel to said axis $\delta$, said recesses being distributed in a configuration repeating the curvature of the shell,
- the through recesses are closed by flanges so as to constitute one or more chambers in said shell support, said chamber or each of the chambers being sealed for a liquid under pressure, said chamber or each of the chambers having an inlet for a liquid for regulating the pressure in said chamber,
- according to an alternative, the means of weakening the cross section extend, in a direction parallel to the axis $\delta$, over an intermediate area of said bearing, with the exception of its ends,
- in particular the means of weakening the cross section may be formed by a section of limited thickness, less than the thickness of said shell support at its ends,
- optionally, the ends of said shell, in a direction parallel to the axis $\delta$, with a thickness greater than the thickness of said section of limited thickness, can consist of elements distinct from the part supporting the shell with a section of limited thickness.

The invention also concerns the use of said hydrodynamic bearing according to the invention for supporting and guiding a rotating cylinder, hollow, optionally deformable in the radial direction, subjected internally to unequally distributed forces, in particular a grinder.

The invention will also concern a grinder comprising at least:
- a hollow cylinder the internal wall of which forms a circular track,
- a roller able to roll on said circular track,
- means for applying said roller to the circular track according to a given force,
- means for supporting the hollow cylinder and guiding it in rotation.

According to the invention, the means for supporting the hollow cylinder and guiding it in rotation comprise at least one hydrodynamic bearing according to the invention, the means of weakening the cross section of said hydrodynamic bearing being positioned at the area where the forces exerted by said roller on said hollow cylinder are applied.

The invention will be better understood from a reading of the following description accompanied by the attached drawings, among which.

The invention concerns first of all a hydrodynamic bearing 1 intended to support a cylinder 2 driven in a rotation movement about its axis.

The diameter of the cylinder is greater than or equal to one meter. The cylinder is hollow, optionally deformable in the radial direction.

Said bearing consists essentially of a shell 3, in particular made from a soft metal, such as bronze or white metal or other antifriction metal, and a shell support, in particular made from a metal with a hardness greater than said shell, such as for example steel.

The shell 3, in particular of constant thickness, extends in a portion of a cylinder of axis δ and has a guide surface 31 intended to match the external surface of the cylinder through a film of lubricant.

This guide surface 31 has a radius of curvature corresponding to that of said cylinder 2 (greater than or equal 0.5 m).

The shell 3 also has a surface 32 secured to said support of the shell 4.

As illustrated, the shell support 4 absorbs the forces over the entire surface 32 of the shell, opposite to the guide surface 31, without discontinuity of contact, in order to control the deformation of said shell 3.

According to the invention, the shell support 4 has, where applicable locally, at least at an intermediate area of said bearing, means 5; 6; 7; 8 for weakening the cross section, allowing an elastic deformation of said bearing so as to limit the maximum guidance forces on said shell 3.

These weakening means also enable the shell 3 to deform to a limited extent, and thus to obtain a more even distribution of the guidance forces on the shell.

Figure 1:
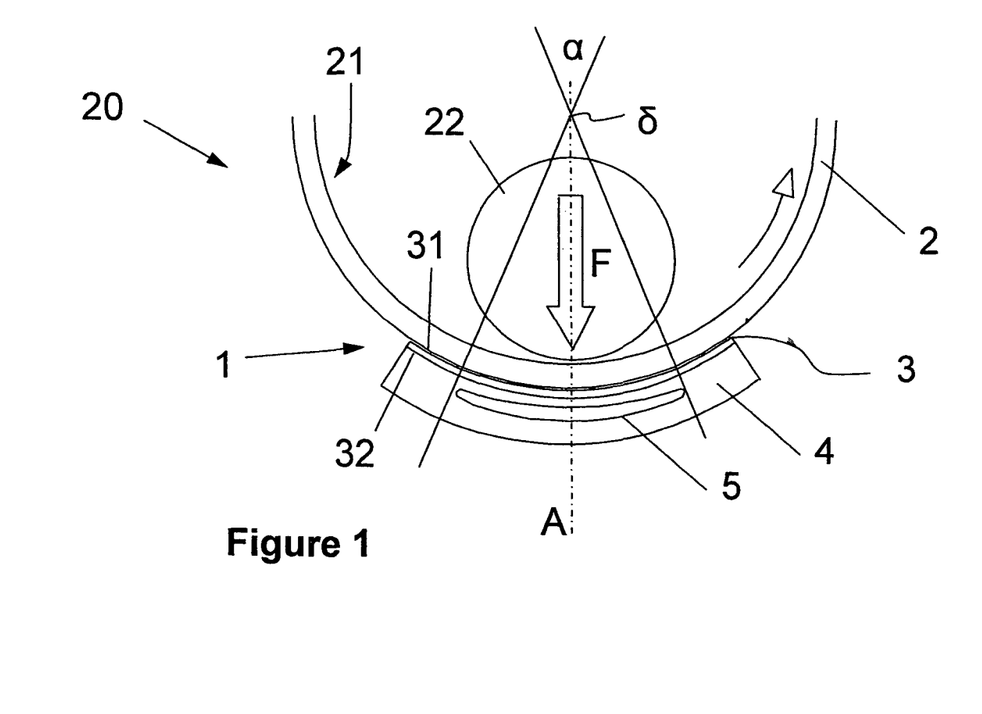
FIG. 1 is a schematic view of a grinder with a hollow cylinder and roller equipped with a hydrodynamic bearing according to the invention according to one embodiment.
Figure 2:
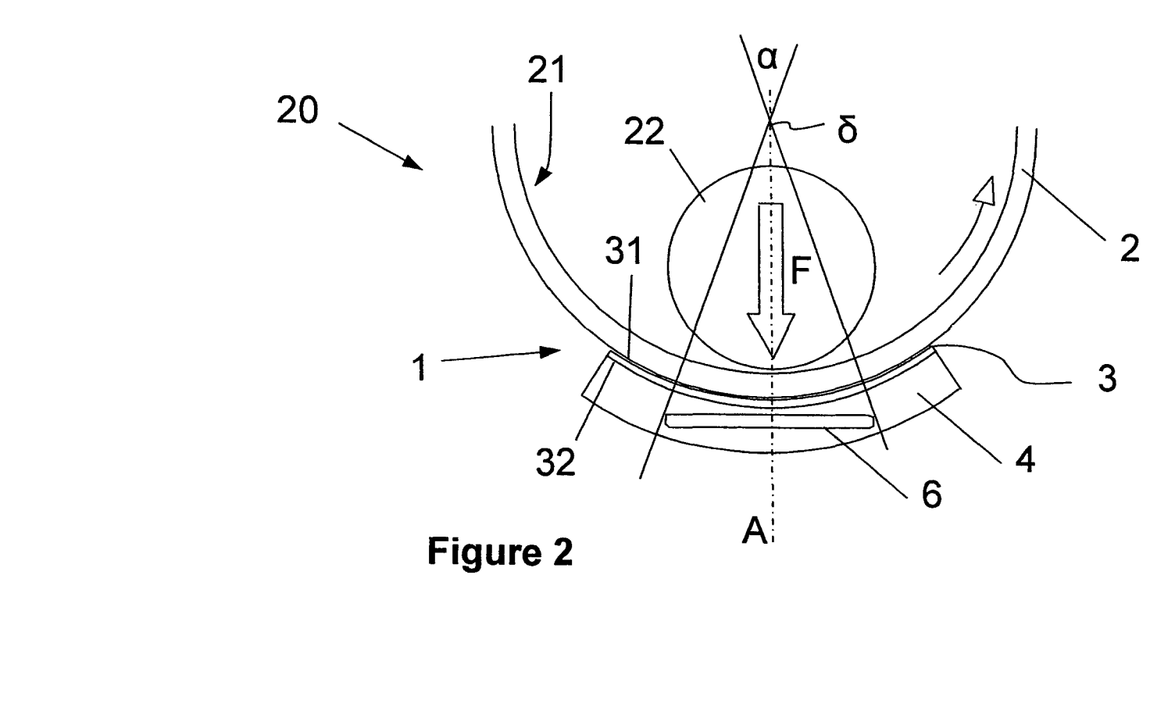
FIG. 2 is a view of a grinder with a hollow cylinder and roller equipped with a hydrodynamic bearing according to the invention according to a second embodiment.
Figure 3:
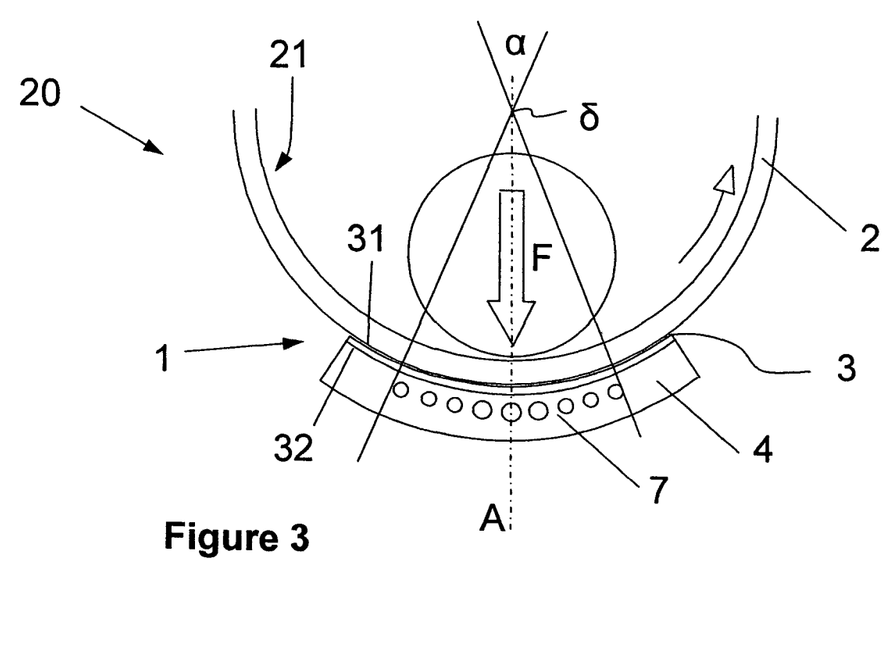
FIG. 3 is a view of a grinder with a hollow cylinder and roller equipped with a hydrodynamic bearing according to the invention according to a third embodiment.

According to the examples in FIG. 1, 2 or 3, the means of weakening the cross section may extend, in a direction parallel to the axis δ, over the entire length of said bearing, and consist in particular of one or more through recesses 5; 6; 7.

Figure 4:
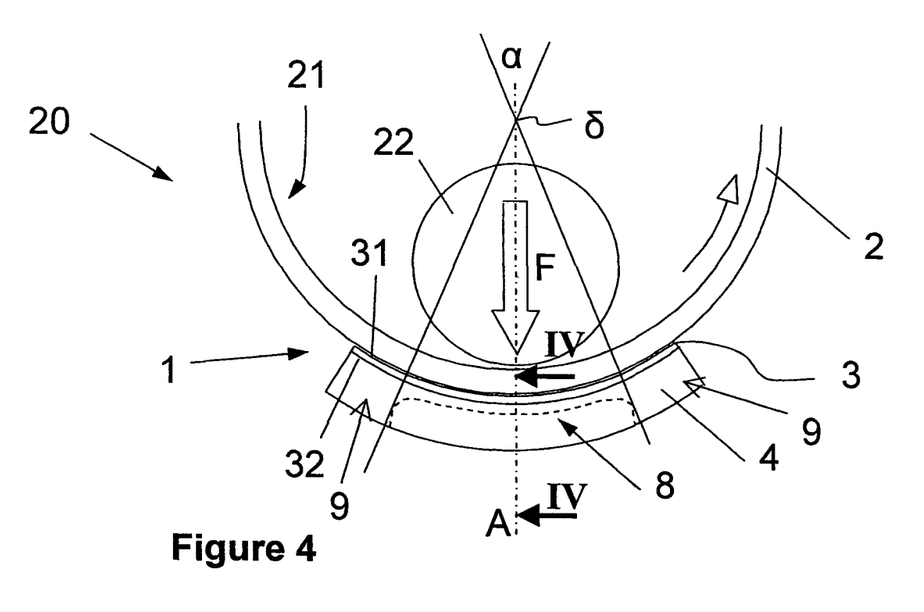
FIG. 4 is a view of a grinder with a hollow cylinder and roller equipped with a hydrodynamic bearing according to the invention according to a fourth embodiment.
Figure 5:
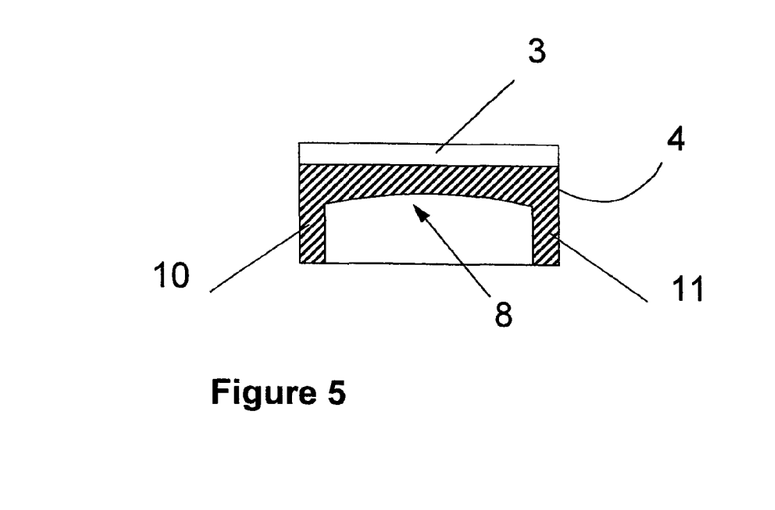
FIG. 5 is a view along the section IV-IV of the bearing as illustrated in FIG. 4.
Figure 6:
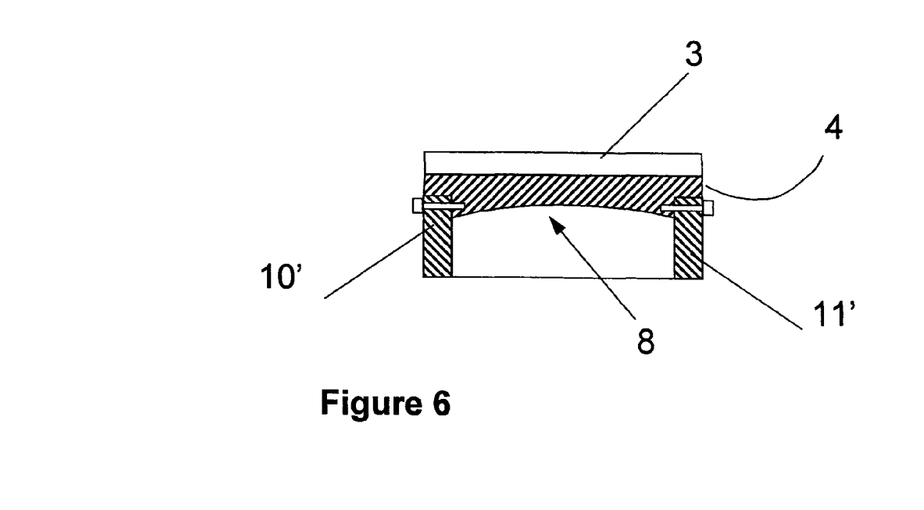
FIG. 6 is a view, according to an alternative, of the section IV-IV of the bearing as illustrated in FIG. 4.

According to another embodiment illustrated in particular in FIGS. 4, 5 and 6, the means of weakening the cross section may extend, in a direction parallel to the axis δ, and over an intermediate area of said bearing, with the exception of its ends 10, 11; 10', 11', and consist in particular of a section of limited thickness less than the thickness of said shell support 4 at its ends.

The hydrodynamic bearing according to the invention will find a particular application for supporting and guiding a hollow rotation cylinder, possible deformable in the radial direction and subjected to unequally distributed forces such as that of a grinder.

The invention also concerns a grinder 20 comprising at least:
- a hollow cylinder 2 the internal wall of which forms a circular track 21,
- a roller 22 able to roll on the circular track 21,
- means for applying said roller 22 on the circular track according to a given force,
- means for supporting said hollow cylinder and guiding it in rotation.

According to the invention, the means for supporting said hollow cylinder and guiding it in rotation comprise at least one hydrodynamic bearing 1 according to the invention, the means 5; 6; 7; 8 of weakening the cross section of said hydrodynamic bearing 1 being positioned at the area of application of the forces exerted by said roller 22 on said hollow cylinder 2.

We now describe in detail the examples in FIGS. 1 to 6. It should be noted that the example grinders in FIGS. 1 to 4 have a single roller and a single hydrodynamic bearing.

FIG. 1 is a schematic view in a vertical section of a grinder 20 according to the invention. This grinder comprises a hollow cylinder 2 the diameter of which is at least one meter and the internal wall of which forms a circular track 21, which can be driven in rotation about its axis by means of a cooperating device, not shown. Such a cylinder is liable to be deformed in the radial direction under the action of the forces to which it is subjected.

It has a roller 22 with its axis parallel to the axis of the hollow cylinder 2, able to run on the circular track, and means for applying said roller 22 on the circular track at a given force, in particular consisting of one or more hydraulic rams.

A hydrodynamic bearing 1 according to the invention is positioned in line with the forces F exerted by the roller 22 on the hollow cylinder 2, said means 5 of weakening the cross section being positioned at the area where the forces exerted by said roller 22 are applied.

More particularly, the bearing 1 consists of a shell 3 with a substantially constant thickness extending along a portion of a cylinder of axis δ. This shell has a guide surface 31 intended to match the external surface of the cylinder 2, in particular hollow, though a film of lubricant, and a surface 32 secured to said shell support 4.

According to this example in FIG. 1, the shell support 4 is in a single piece, in particular metal, for example made from steel. The means of weakening the cross section are formed by an oblong recess 5, of closed section, extending parallel to the curvature of the shell 3 and passing through in a direction parallel to said axis δ. In the other direction perpendicular to the axis δ, the recess 5 extends only locally over an intermediate area of said bearing lying in an angle α the center of which is on the axis δ.

The example in FIG. 2 is distinguished from the example in FIG. 1 by the form of the oblong recess 6, which extends parallel to a tangent to said cylinder of axis δ, in particular perpendicular to the direction of the forces F of the roller 22 on the hollow cylinder 2. This oblong recess 6 also passes through in a direction parallel to said axis δ, and with a closed cross section.

The example in FIG. 3 is distinguished from the previous examples in that the means of weakening the cross section are formed by a set of recesses 7, of closed cross section, parallel to each other and passing through in a direction parallel to said axis δ. According to the example in FIG. 3, the recesses 7 are distributed in a configuration repeating the curvature of the shell 3, at rest.

Advantageously, according to one embodiment, the recess 5, 6 of the examples in FIGS. 1, 2 or the recesses 7 of the example in FIG. 7, can be closed by flanges so as to constitute one or more chambers in the shell support 4.

The or each chamber is sealed for pressurized liquid, said chamber or each of the chambers having an inlet for a liquid making it possible to adjust the pressure in said chamber. It is thus possible, by controlling the pressure of the fluid inside the or each chamber, to adjust the elasticity of the bearing according to the operating conditions. For this purpose, the bearing will be associated with a hydraulic pump and a control device for adjusting the pressure of liquid in the bearing.

The example in FIG. 4 is distinguished from the examples in FIGS. 1 to 3 in that the means of weakening the cross section extend only partially along the axis δ, over an intermediate area of said bearing 1, with the exception of its ends 10, 11; 10', 11', and in that the means of weakening the cross section are formed by a section of limited thickness, less than the thickness of said shell support 4 at its ends 9, 10, 11; 9', 10', 11'.

The ends 10, 11 or 10', 11' are the ends of the shell support 4 along the axis δ. The ends 9 are the ends of the shell support 4 in a direction transverse to the direction of axis δ.

According the example in FIG. 4, it will be noted that the section of limited thickness 8 extends in a direction perpendicular to the axis δ partially, over an intermediate area of said bearing, lying in angle α having its center situated on the axis δ, the ends 9 of the shell support 4 of the bearing being of much greater thickness, in this direction. In addition, this section of limited thickness 8, as illustrated in the cross-section view in FIG. 5, also extends locally, in a direction parallel to the parallel axis δ, over an intermediate area of said bearing, the ends 10, 11 of the shell support 4 of the bearing in this direction being of a thickness much greater than said section 8.

According to FIG. 5, it will be noted that its ends 10, 11 and the section of limited thickness 8 of said shell support 4 are in a single piece. The example embodiment in FIG. 6 is distinguished from FIG. 5 in that the ends 10', 11' of the shell support are formed by elements distinct from the part of the shell support 4 with a section of limited thickness 8. These elements 10', 11' are secured to the body of the shell by any suitable means, in particular welding, or screw system.

Naturally other embodiments could have been envisaged by a person skilled in the art without for all that departing from the scope of the invention defined by the following claims.

The invention claimed is:

1. A hydrodynamic bearing (1) for supporting a hollow cylinder (2) which is to be driven in a rotation movement about an axis of rotation, said bearing (1) consisting essentially of a shell (3) and a shell support (4),
    wherein said shell (3) extends in a portion of a cylinder of axis δ, having a guide surface (31), with a radius of curvature intended to correspond to the radius of curvature of said cylinder (2), intended to match the external surface of said cylinder (2) through a film of lubricant, and a surface (32) secured to said shell support (4), opposite to said guide surface (31), said shell (3) and said shell support (4) intended to support a cylinder having a diameter greater than or equal to one meter, and
    wherein the shell (3) is made from a soft metal, said shell support (4) being made from a metal with a hardness greater than the metal of said shell (3), said shell support (4) absorbing the forces over the entire surface (32) of said shell (3) opposite to the guide surface (31), without any discontinuity of contact in order to control the deformation of said shell (3), the shell support (4) having, at least at an intermediate area of said bearing (1), means (5; 6; 7; 8) of weakening the cross section conferring on said shell support (4) an elasticity, allowing an elastic deformation of said bearing (1) so as to limit the maximum value of the guide forces on said shell (3).

2. The bearing according to claim 1, wherein said means of weakening the cross section are formed by one of more recesses (5; 6; 7).

3. The bearing according to claim 1, wherein said means (5; 6; 7) of weakening the cross section extend, in a direction parallel to the axis δ, over the entire length of said bearing (1).

4. The bearing according to claim 1, wherein the shell support (4) is in a single piece and in which said means of weakening the cross section are formed by an oblong recess (5), with a closed cross section, extending parallel to the curvature of the shell (3), said oblong recess (5) passing through in a direction parallel to said axis δ.

5. The bearing according to claim 1, wherein the shell support (4) is in a single piece, and said means of weakening the cross section are formed by an oblong recess (6), with a closed section, extending parallel to a tangent to said cylinder of axis δ, said oblong recess (6) passing through in a direction parallel to said axis δ.

6. The bearing according to claim 1, wherein the shell support (4) is in a single piece, and said means of weakening the cross section are formed by a set of recesses (7), with closed sections, parallel to each other and passing through in a direction parallel to said axis δ, said recesses (7) being distributed in a configuration repeating the curvature of the shell (3).

7. The bearing according to claim 2, wherein the or each recess of which constitutes a chamber in said shell support (4), said chamber or each of the chambers being sealed for a pressurized liquid, said chamber or each of the chambers having an inlet for a pressurized liquid making it possible to adjust the pressure in said chamber.

8. The bearing according to claim 1, wherein said means of weakening the cross section extend, in a direction parallel to the axis δ, over an intermediate area of said bearing with the exception of ends of said shell support (10, 11; 10', 11').

9. The bearing according to claim 8, wherein said means of weakening the cross section are formed by a section of limited thickness (8), less than the thickness of said shell support (4) at the ends (9, 10, 11; 9', 10', 11').

10. The bearing according to claim 9, wherein the ends (10', 11') of said shell in a direction parallel to the axis δ are formed by elements distinct from the shell support part (4) with a section of limited thickness (8).

11. The bearing according to claim 1, wherein said shell (3) is of constant thickness.

12. The bearing according to claim 1, wherein the metal of the shell (3) is bronze, white metal or another antifriction metal and the metal of the shell support (4) is steel.

13. A method of supporting and guiding a rotating hollow cylinder subjected internally to unequally distributed forces (F), of a grinder, said method comprising:
provi­ding a hydrodynamic bearing according to claim 1, and using said hydrodynamic bearing to support and guide the cylinder of the grinder during rotation.

14. A grinder (20) comprising at least:
a hollow cylinder (2) the internal wall of which forms a circular track (21),
a roller (22) able to roll on said circular track,
means for applying said roller (22) to the circular track according to a given force,
means for supporting the hollow cylinder and guiding it in rotation,
wherein said means for supporting said hollow cylinder and guiding said hollow cylinder in rotation comprise at least one hydrodynamic bearing (1) according to claim 1, the means (5; 6; 7; 8) of weakening the cross section of said hydrodynamic bearing (1) being positioned at the area where the forces exerted by said roller (22) on said hollow cylinder (2) are applied.

15. The grinder (20) according to claim 14, wherein said grinder has a single roller (22) and a single hydrodynamic bearing.

16. The bearing according to claim 2, wherein said means (5; 6; 7) of weakening the cross section extend, in a direction parallel to the axis δ, over the entire length of said bearing (1).

17. The bearing according to claim 2, wherein said means of weakening the cross section extend, in a direction parallel to the axis δ, over an intermediate area of said bearing with the exception of ends of said shell support (10, 11; 10', 11').

18. The method according to claim 13, wherein the cylinder is deformable in a radial direction.

19. The grinder according to claim 14, wherein the cylinder is deformable in a radial direction.

* * * * *